Nov. 30, 1954     W. SOLLER ET AL     2,695,982
CONTROL CIRCUIT FOR ALTERNATING CURRENT MOTORS
Filed Dec. 23, 1944     2 Sheets-Sheet 2
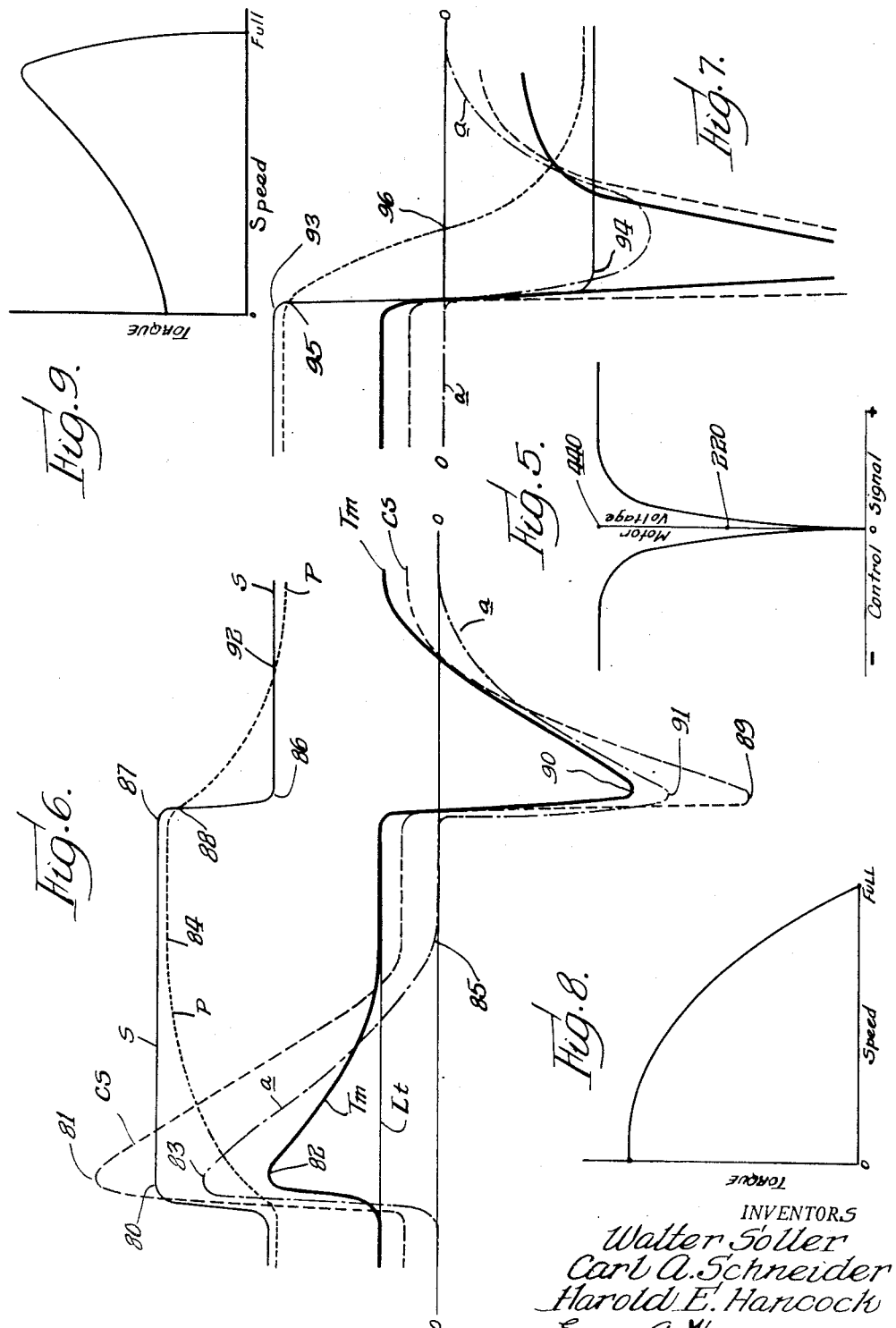
INVENTORS
Walter Soller
Carl A. Schneider
Harold E. Hancock United States Patent Office 2,695,982
Patented Nov. 30, 1954

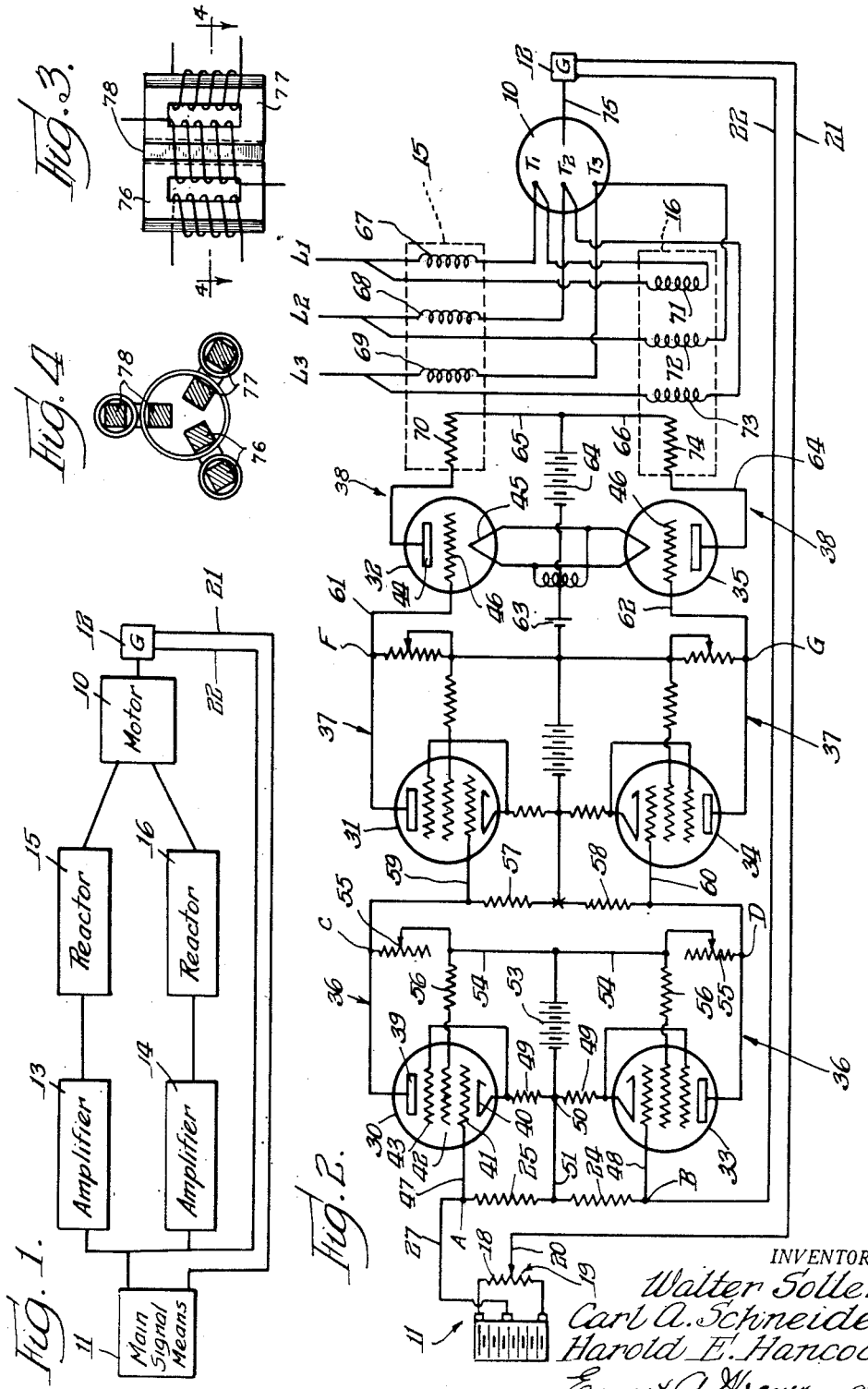

2,695,982

CONTROL CIRCUIT FOR ALTERNATING CURRENT MOTORS

Walter Soller, Carl A. Schneider, and Harold E. Hancock, Cincinnati, Ohio, assignors to Askania Regulator Company, Chicago, Ill., a corporation of Illinois Application December 23, 1944, Serial No. 569,476

10 Claims. (Cl. 318—202)

The invention relates generally to a control circuit and more particularly to a control circuit for an alternating current motor.

One object of the invention is to provide a new and improved control circuit adaptable for use with a variety of alternating current motors and particularly induction motors.

Another object is to provide a new and improved control circuit for alternating current motors that is free of switches, relays or other circuit breaking devices in the power circuit for the motor.

Another object is to provide a control circuit for an induction motor which is operable to govern the direction and speed of rotation of the motor and to maintain the motor operating at any desired speed within the range in either direction of rotation.

Another object is to provide a control circuit for an induction motor wherein the direction and speed of rotation of the motor are governed by a small pilot or control current and without breaking or other physical manipulation of the power circuits for the motor.

A further object is to provide a control circuit for an induction motor which is operable to govern the direction and speed of rotation of the motor, which effects, where desired, rapid acceleration or deceleration of the motor and which permits adjustment of the control circuit from a condition calling for full speed of the motor in one direction to a condition calling for full speed in the opposite direction without necessity of a pause in a neutral condition while waiting for the motor to come to rest and without sparking, overload of some portion of the circuit, or similar undesirable reactions.

A further object is to provide a control circuit for an induction motor which is operable to govern the direction and speed of rotation of the motor and which is further operable upon adjustment calling for a reversal in the direction of motor rotation or upon adjustment calling for any material reduction in speed of rotation immediately to produce a counter torque acting to decelerate the motor quickly regardless of the direction of rotation of the motor.

Yet another object is to provide a control circuit for an induction motor which is operable to govern the direction and speed of rotation of the motor and which is further operable upon adjustment calling for a reversal in the direction of motor rotation instantly to produce a high counter torque for decelerating the motor to zero speed and thereafter acting to accelerate the motor in the opposite direction, the torque gradually reducing to that required to drive the motor at a constant speed at the rate called for.

Still another object is to provide a control circuit for an induction motor operable remotely and with a small control current to govern the direction and speed of rotation of the motor.

A further object is to provide a control circuit, a main signal generating means capable of generating signals of opposite character, operation indicating means driven from the motor controlled by the circuit and capable of generating signals of opposite character, and means operable in response to the difference between the operation indicating signal and the main signal and the character thereof to cause the production by the motor of such torque as will drive the motor substantially at the speed and in the direction called for by the main signal within the capacity of the motor regardless of the load on the motor.

Yet a further object is to provide a control circuit for an alternating current motor operable to govern the speed and direction of rotation of the motor and further operable to cause the motor normally to operate at its rated voltage but, during periods of reversal or other abnormal acceleration or deceleration, to have momentarily applied thereto voltages higher than its rated voltage.

Still a further object is to provide a circuit operable in conjunction with suitable windings and a three-phase power source to produce a rotating magnetic field of variable magnitude and variable direction of rotation without disconnection or other physical change in the connections to the windings.

Other objects and advantages will become apparent from the following description taken in connection with the accompanying drawings, in which:

Fig. 1 is a block type diagrammatic showing of a control circuit embodying our invention.

Fig. 2 is a diagrammatic showing of one particular form that the circuit of Fig. 1 may take.

Fig. 3 is an elevational view of a saturable reactor suitable for employment in the circuit of Fig. 1.

Fig. 4 is a horizontal sectional view of the saturable reactor of Fig. 3.

Fig. 5 is a graphic illustration showing the relationship between the control signal and the voltage on the motor.

Fig. 6 is a graphic illustration of the operation of the circuit with the circuit first manipulated to call for an increase in motor speed and subsequently calling for a decrease in motor speed.

Fig. 7 is a graphic illustration similar to Fig. 6 of the operation of the circuit while effecting reversal of the motor.

Fig. 8 is a graphic representation of a speed-torque characteristic of a wound rotor, three-phase induction motor.

Fig. 9 is a graphic illustration of a speed-torque characteristic of a squirrel cage, three-phase induction motor.

While the invention is susceptible of various modifications and alternative constructions, it is herein shown and will hereinafter be described in a preferred embodiment. It is not intended, however, that the invention is to be limited thereby to the specific construction disclosed. On the contrary it is intended to cover all modifications and alternative constructions and all uses and adaptations of the invention as fall within the spirit and scope of the invention defined by the appended claims.

For purposes of disclosure, the invention is herein shown and will hereinatfer be described as applied to the control of a multi-phase, in this instance three-phase, induction motor 10, the speed control and the rapid reversal of which have long remained problems which have not been satisfactorily solved. While the circuit is herein disclosed as applied to a three-phase induction motor, the impression is not to be gained that the circuit is usable only for the control of that specific type of motor. On the contrary, the employment of the circuit for the control of other motors and possibly even other electrical devices will readily appear to those skilled in the art as the description of the circuit proceeds.

The circuit comprises generally a main signal generating means 11 capable of generating signals of varying magnitude and opposite in character. Driven from the motor 10 is a second signal generating means 12 of such character and so coupled to the motor as to generate an operation indicating or pilot signal varying in magnitude with the speed of rotation of the motor and producing signals of opposed character with reversal in the direction of rotation of the motor. This second signal generating means is connected in the circuit as an inverse feed-back in a manner and for purposes all of which will be hereinafter disclosed in greater detail. Also in the circuit are two similar and parallel amplifiers 13 and 14 connected so that one will operate only in response to a signal of one character, while the other will operate only in response to a signal of opposed character. Completing the circuit and, with the amplifiers 13 and 14 constituting an important feature of the invention, are a pair of saturable reactors 15 and 16. These reactors have certain of their coils connected in the power leads to the motor 10, while other of their coils are connected to the amplifiers 13 and 14. While, for purposes of subsequent detailed description, the circuit has above been broken down into signal generating means 11, amplifiers 13 and 14, and saturable reactors 15 and 16, it is believed readily apparent that these several units might be considered as a single, very large amplifier converting small signals into currents and voltages suitable for motor operation.

Broadly speaking, the saturable reactors are effective, without interruption of the power circuit to the motor, in response to a signal resulting from the combination of the main signal and the operation indicating or pilot signal to control the voltage applied to the motor so as to obtain operation of the motor at different desired speeds and to control the phase sequence of the applied voltage so as to govern the direction of rotation of the motor. In order that the signal to which the saturable reactors respond, hereinafter referred to as the "control signal," may function automatically, rapidly and precisely to bring about and to maintain desired operation of the motor, the main signal magnitude bears a definite relationship to the speed of the motor and the character of the main signal bears a relationship to the direction of rotation of the motor. The pilot signal bears a similar relation in magnitude and character, respectively, to the speed and direction of rotation of the motor, the resulting or control signal in the steady state operation of the circuit being proportional to the torque required to drive the motor at the speed called for by adjustment of the main signal means. "Proportional" is herein employed in the broad sense as the opposite of "inversely proportional," and is not intended to mean a direct or even a straight line proportionality. Fig. 5 is referred to as the proportionality intended. During periods of change, such as called-for change in speed of rotation of the motor or in direction of rotation, the control signal will not remain proportional to the torque required to drive the motor at the called-for speed but will indicate higher or even counter torques so as to effect the adjustment as rapidly as possible.

Speaking in somewhat greater particularity, it will be apparent as the description proceeds that, when the signal of the main signal generating means 11 is zero, the motor 10 will be at rest and that, as the signal is increased, the speed of the motor will be increased and that it will, moreover, have definite speeds for various signal values, the direction of rotation of the motor being determined by the character of the signal. It will also become apparent that this speed of the motor for any given main signal value is, by combination of the pilot signal with the main signal, substantially maintained regardless of the load on the motor, assuming, of course, that such load is within the capacity of the motor, the torque of the motor being automatically varied so as to produce just that torque necessary to maintain the given speed while carrying the applied load. Rapid acceleration and, particularly, deceleration of the motor are obtained, the circuit functioning to cause a counter torque to be produced in the motor over certain periods of deceleration of the motor.

Turning now to the more detailed circuit disclosed for exemplary purposes in Fig. 2, the main signal generating means 11 is there shown as a direct current signal generating means operable to produce a positive or a negative signal. Such a direct current generating means may, as here, take the form of a battery 17 having its end terminals interconnected by a resistor 18 forming part of a potentiometer 19 having an adjustable contact 20. The pilot or operation indicating signal generating means 12 is a direct current generator capable of producing a direct current voltage proportional to the speed of rotation of the motor 10. The generator 12 is so selected and calibrated as to produce a voltage substantially equal in magnitude to the voltage of the main signal for given speeds of rotation of the motor. One terminal of the generator 12 is by a lead 21 connected to the adjustable contact 20 of the potentiometer 19, while the other terminal of the generator is by a lead 22 connected to one end terminal B of a pair of resistors 24 and 25 connected in series and having their other end terminal A connected by a lead 27 to the midpoint of the battery 17. The generator 12 is so connected that when the contact 20 is so adjusted as to produce a positive signal from the battery 17 the generator, upon being driven in the direction called for by such positive signal, will generate a signal opposing the main signal and, conversely, when the battery generates a negative signal, the generator 12, in being driven in the direction called for by such negative signal, will again generate a signal of a polarity opposing the main signal.

The control signals resulting from combination of the main and the pilot signals are amplified by the amplifiers 13 and 14 which are connected in parallel and are operative one to respond only to a signal of one character, herein a positive signal, the other to respond only to a signal of the opposite character, herein a negative signal. While a variety of amplifiers varying in details of construction might be employed to accomplish that end, there has been shown in detail in Fig. 2, for purposes of complete disclosure, a pair of parallelly connected amplifiers functioning as above generally described. Each amplifier comprises three electron tubes 30, 31 and 32, and 33, 34 and 35, respectively, arranged to form two amplification stages 36 and 37 and a current output stage 38. The tubes 30, 31, 33 and 34 are standard five-element vacuum tubes known in the trade by the number 1852, each having an anode or plate 39, a cathode 40, a control grid 41, and two screen grids 42 and 43. The tubes 32 and 35 are each three-element tubes known in the trade by the number 2A3, each having an anode or plate 44, a cathode 45, and a grid 46. The cathodes of the tubes are heated in conventional manner by means not here shown. The control grids 41 of the tubes 30 and 33 are by leads 47 and 48 connected, respectively, to the end terminals A and B of the voltage divider formed by the resistors 24 and 25. The cathodes 40 of the tubes 30 and 33 are through suitable resistances 49 connected to a common point 50, which point is connected to the common terminal of the resistors 24 and 25 by a lead 51. Plate potential is provided by a suitable means, here shown as a battery 53, connected in well known manner to form plate circuits 54. Each of the plate circuits herein includes a variable resistance 55, with the screen grid 42 including in its connection to the plate circuit a resistance 56.

The second amplification stages 37 of each amplifier are identical with the first stages. Suffice it to say, therefore, that these stages are coupled to the first stages 36 through the medium of a voltage divider composed of resistors 57 and 58 connected across the plate circuits of the first stages at points C and D. Like the first stages, the control grid of tube 31 is by a lead 59 connected to the end terminal of the resistor 57, while the control grid of tube 34 is by a lead 60 connected to the end terminal of the resistor 58. The plate circuits of the second amplification stages provide points comparable to the points C and D of the first stages and are for reference purposes herein designated F and G, respectively.

The grids 46 of the tubes 32 and 35 are by leads 61 and 62, respectively, connected to the points F and G. The grid circuit for the tubes 32 and 35 includes a suitable grid biasing means 63 common to the two tubes and plate potential for the tubes is provided by a suitable means 64 common to the plate circuits 65 and 66 of the tubes 32 and 35. Means 63 and 64 are again shown, by way of example, as batteries.

Each of the tubes 30, 31, 33 and 34 is herein biased critically to respond to negative signals only. By that is meant that a change in the grid voltage from the bias voltage in a positive direction causes only a very slight increase in current flow, while a change in the grid voltage in a negative direction from the bias voltage causes a great and proportional decrease in current flow. Biasing of the tubes 30, 31, 33 and 34 in this manner is not essential to the operation of the circuit, but is desirable from the standpoint of protecting the tubes at large positive grid potentials. The tubes 32 and 35, on the other hand, are biased normally to cut off and operate when the grid potential rises above the cut-off value.

Ignoring for the present the signal produced by the pilot signal generator 12, it will be seen from the foregoing that if the main signal generating means 11 is adjusted to its neutral position, that is, so as to produce neither a positive nor a negative signal, the tubes 32 and 35 will not be operative. As above stated, the tubes 32 and 35 are normally biased to cut off. If then the main signal generating means applies no signal, there will be no change in the operation of tubes 30 and 33 and so the potentials at the points C and D will remain the same and balanced, with the result that there is no change in the operation of the tubes 31 and 34 and hence no change in the normal bias of the tubes 32 and 35. If it be assumed, however, that the main signal generating means be so adjusted as to produce a signal such as causes the potential of the terminal A to be raised and the potential of the terminal B to be lowered, which adjustment of the main signal generating means will herein be considered as producing a positive signal, a plate current will be obtained from the tube 32 which is proportional to the magnitude of the signal generated by the main signal generating means.

The circuit operates in this manner: With the terminal A raised in potential, there will be an increase in current flow through the plate circuit of the tube 30. This, however, due to the manner in which the tube is biased, will, as already pointed out, be a very slight increase only. This slight increase in plate current will lower slightly the potential of the point C. Grid potential of the tube 33 has, however, been decreased, which decrease causes a substantial decrease in the plate current of the tube 33. With this substantial decrease in plate current, the potential at point D increases. This difference in potential between the points C and D, being applied as it is across the voltage divider formed by the resistors 57 and 58, results in an increase in the grid potential of the tube 34 and in a decrease in the grid potential of the tube 31. As before, increase in the grid potential of tube 34 will only slightly increase its plate current, thereby slightly lowering the potential at the point G. This will thus maintain the potential of the grid 46 of the tube 35 below its cut-off value and thus maintain the tube 35 cut off. On the contrary, the decrease in the potential of the control grid of the tube 31 substantially decreases the plate current of that tube, thereby increasing substantially the potential of the point F. This increase in potential of the point F increases the potential of the grid 46 of the tube 32, thereby causing flow of plate current proportional to the signal applied to the tubes 30 and 33.

If the main generating means 11 is now adjusted in the opposite direction from its neutral position, which, for convenience, will be termed a negative signal, the terminal or point B now will have its potential raised, while the terminal or point A will have its potential lowered. The operation, therefore, will be just the reverse of that above described with the tube 32 remaining cut off and with the tube 35 now having a plate current proportional to the signal.

When the signal generated by the pilot signal generating means 12 is considered and no longer ignored, as in the above description, the magnitude of the resulting or control signal impressed on the resistors 24 and 25 will, of course, vary with respect to that generated by the main signal generating means 11, and the signal may even be changed in character, that is, from positive to negative and vice versa, depending upon the character and magnitude of the pilot signal. However, the operation of the amplifiers will be the same causing operation of tube 32 when the resultant or control signal is positive, and causing operation of the tube 35 when the resultant or control signal is negative, as above defined. The magnitude of the plate current of either of the tubes 32 or 35 will, of course, vary with the magnitude of the resultant or control signal.

Herein this small control current is utilized to govern the direction and speed of rotation of an alternating current motor without interruption of the power circuit for the motor and, in fact, without any mechanical changes or adjustments of the power circuit for the motor or elements contained therein. This is accomplished by the employment of the pair of saturable reactors 15 and 16 above generally mentioned. The saturable reactors are of the same construction, with the reactor 15 composed of three alternating current windings 67, 68 and 69, each wound, in effect, on a separate leg of an iron core, and a direct current winding 70 wound, in effect, on a leg of the core common to all of the alternating current windings. Similarly, reactor 16 has three alternating current windings 71, 72 and 73 and a direct current winding 74.

For a better understanding of the magnetic circuit of the saturable reactors, a simple reactor has been illustrated in Figs. 3 and 4. As best seen in Fig. 4, the magnetic circuit of the reactor is composed of three cores 76, 77 and 78 disposed at 120° angles with one another and with each core herein divided so as to form two parallel legs. Wound on the outer leg of each core is an alternating current winding, while surrounding all three of the inner legs of the cores is the common direct current winding. The proper condition of saturable reactors is that no alternating current flux be linked with the direct current coil inducing a voltage therein. Since in most instances the current in all of the three alternating current coils will be equal but of different phase, the alternating current fluxes in the legs of the cores common to the direct current coil will cancel out and hence be zero. It is to be appreciated, however, that it may in some instances be necessary to employ saturable reactors of more complicated design where, for example, the currents in the three alternating current coils are not equal.

The alternating current coils of the saturable reactors are connected in the power circuit for the motor 10 which, as stated, is herein a three-phase induction motor. Thus winding 67 is connected between a line wire L1 and a terminal T1 of the motor 10. Similarly, winding 68 is connected between a line wire L2 and a terminal T2, while winding 69 is connected between a line wire L3 and a terminal T3 of the motor. Winding 71 of the saturable reactor 16 is also connected between the line wire L1 and the terminal T1. Windings 72 and 73, however, are reversed with respect to windings 68 and 69, with winding 72 connected between the line wire L2 and the terminal T3, and with the winding 73 connected between the line wire L3 and the terminal T2.

The direct current winding 70 of the reactor 15 is connected in series in the plate circuit 65 of the tube 32, while the direct current winding 74 of the reactor 16 is connected in series in the plate circuit 66 of the tube 35. The alternating current windings of each reactor under normal conditions have an impedance so high that substantially the entire voltage drop occurs across the windings so that the voltage impressed upon the motor is insufficient to operate the same. With flow of current in the direct current winding, however, the impedance of the alternating current windings is lowered to permit line voltage to be impressed on the motor. Thus, depending upon which of the direct current windings 70 and 74 has current flowing therein, the motor will be under the control of one or the other of the reactors and thereby have its direction of rotation determined, while its speed of rotation will be determined by the magnitude of the current flowing in the direct current winding. More particularly, as one or the other of the windings 70 and 74 has current flowing therein, the core of that reactor will become progressively more saturated as the current increases, and thus will reduce the impedance of the alternating current windings permitting more and more of the line voltage to be impressed upon the motor. The core of the reactor whose direct current winding does not have the current flowing therein will, of course, not alter the impedance of its alternating current windings and thus will continue to prevent the voltage of the line from being impressed upon the motor. There is, therefore, no bucking, and no simultaneous impressing on the motor of voltages of different phase sequence. Thus with the phase sequence of the impressed voltage altered by energization of one or the other of the direct current windings and with the magnitude of the impressed voltage controlled by the magnitude of the current flowing in the direct current winding energized, the motor will operate in one direction or another depending upon which of the direct current windings is energized, and the speed of rotation for a given load will bear a relationship to the magnitude of the current in the direct current winding, at least over certain ranges.

It is to be noted that the power circuit for the motor is at no time broken, not even for reversal of the motor; that all switches whether manual, solenoid actuated, or parts of relays, all rheostats or other mechanically adjustable elements have been eliminated; that there is no direct connection between the power circuit for the motor and the control circuit proper; and that the motor may be controlled by a small current from a remote point.

As above indicated generally, the circuit is completed by an operation indicating or pilot signal generating means 12. This pilot signal generating means, as above stated, is a direct current generator and is mechanically coupled to the motor 10 by means represented at 75 to be driven at speeds proportional to the speed of rotation of the motor. The generator in turn generates a direct current voltage or signal proportional to the speed of rotation of the generator and hence a signal proportional to the angular velocity of the motor 10. Herein the voltage of the signal thus generated is calibrated to be substantially equal to the voltage of a signal generated by the main signal generating means 11 when that is adjusted to a position corresponding to a given speed of the motor 10. The generator 12 is then inversely connected in circuit with the main signal generating means 11 so that the difference between the main signal and the pilot signal will be an indication of the instantaneous torque required to maintain the motor operating at the speed called for by the main signal regardless of the load on the motor.

It is, of course, essential for any motor control circuit to be successful that it maintain the motor operating at the speed called for by adjustment of the main signal generating means 11, and that it quickly and without hunting readjust the speed of the motor to the new speed called for by a change in the adjustment of the main signal generating means. The circuit herein disclosed is unusually efficient in these respects because the inverse feed-back functions to add stability not merely in the ordinary manner of such inverse feed-back, but herein, due to the nature of the amplifiers and the saturable reactors, cooperates uniquely with the amplifiers and the saturable reactors to produce counter torques for quickly and positively effecting a reduction in the speed of the motor or a reversal in the direction of rotation of the motor, or in maintaining the speed of the motor constant with variations in load. With the magnitude of the voltage impressed on the motor and, particularly, with the phase sequence thereof quickly altered with the speed of electrical phenomena without the lag in control produced by the presence of mechanical or partially mechanical devices, and with amplifying means responsive to signals of opposed character, the pilot signal generating means 12 herein is not limited to a mere reduction of the main signal as is customarily the case. On the contrary, the inverse signal of the generating means 12 is herein utilized to the full and is herein effective when it exceeds the magnitude of the main signal to produce a counter torque for effecting a rapid adjustment in the speed of the motor to the desired or called-for speed regardless of the cause which may have necessitated the adjustment in speed. The manner in which these counter torques are herein produced and the manner in which they are utilized to bring about stability of the circuit, coupled with rapid and positive adjustments to new speeds of the motor, will be brought out and best understood from the description of the operation of the circuit which is to follow.

It is desirable, as already stated, that the magnitude of the signal generated by the means 12 at a given speed of the motor be substantially equal to the magnitude of the signal generated by the main signal generating means 11 when adjusted to call for that particular speed of the motor, in order that the motor speed be determined mainly by the signal of the main signal generating means and be comparatively independent of the load which is on the motor. It is further essential, therefore, that the amplifiers 13 and 14 be highly sensitive so as to respond to the small control signal remaining as the difference between two substantially equal signals and that the amplifiers also be capable of producing a direct current of the comparatively high magnitude required to operate the saturable reactors. It is to be understood that the amplifiers herein disclosed are shown by way of example only and that the output of these amplifiers might be enlarged by the incorporation of such additional amplification stages as might be required or amplifiers of various other designs might be employed.

With the pilot signal voltages directly proportional to the angular velocity of the motor; with the control signal bearing a relationship to both torque and acceleration; and with the system responding to very slight changes in the control signal, there will be no overrunning for the electrical reactions are so much more rapid than the mechanical changes as to immediately compensate for such changes even while still in progress, and, above all, the relationship between the control signal and the required torque and acceleration will result in the motor always being brought to speed and will not be caused to overrun. Moreover, regardless of variation in load, the system will always maintain the motor operating at the called-for speed, less, of course, the very slight increment in speed required to produce the control signal. The system will also very rapidly adjust itself to changes either in called-for speed or direction of rotation of the motor or in the load on the motor. Aiding such rapid adjustments are the actual torque reversals which take place under certain conditions and the possibility of momentary application to the motor of voltages much above the rated voltage of the motor, as will presently be described.

An understanding of these advantages and of the manner of operation of the control circuit can best be obtained by a consideration of the graphic illustrations of Figs. 5, 6 and 7 and the assumed conditions there depicted. Let it be assumed, therefore, that the motor 10 is a 220-volt motor but that it is connected to receive its power from a 440-volt source, a condition made possible by this circuit, and one of the important advantages of this circuit. Let it be assumed further that, when the main signal is what has heretofore been arbitrarily referred to as "positive," rotation of the motor in a forward direction is called for and, when the main signal is negative, rotation of the motor in the reverse direction is called for. Similarly, let torques tending to drive the motor in a forward direction be considered positive and torques tending to drive the motor in a reverse direction as negative, and that the pilot signals generated when the motor is operating in a forward direction are positive and are negative when the motor is operating in a reverse direction. Acceleration will always be treated, as it actually is, as a derivative of the speed of rotation regardless of the direction of rotation of the motor. The curve in Figs. 6 and 7 representing the main signal will be identified by the reference character S, the curve representing the pilot signal by the letter P, the curve representing the resulting or control signal by the letters CS (this has for clarity been drawn to a different scale from that of S and P), the curve representing the motor torque by the character T$m$, and the curve representing acceleration by the letter $a$. Let it be assumed also that the load on the motor is constant and is represented by the straight line L$t$, and that the motor is operating at some speed less than its full speed. It is to be understood that the graphs of Figs. 5, 6 and 7 are illustrative of the operation only and are not represented or to be taken as actual plotted values derived from tests performed on the control system.

Let it be assumed further, for the purpose of the immediately following discussion of the operation, that the motor 10 is a wound rotor motor and that sufficient resistance has been introduced so that the torque speed curve of the motor has but one direction of slope, such as the curve shown in Fig. 8. In other words, to produce a condition in which the speed-torque curve has no reversal point and thus assures operation of the motor at what is normally referred to as the stable portion of the curve. This is mentioned here, in order that it may be appreciated that consideration was taken of the fact that three-phase induction motors do have unstable speed-torque characteristics and that in the case of squirrel cage motors it is not possible to add resistances for the purposes of altering that characteristic.

Before proceeding with the discussion of the operation taking place at the time of called-for changes in the operation of the motor, namely, an increase in speed, a decrease in speed, and reversal in the direction of rotation of the motor, and the discussion of the operation resulting with changes in load on the motor, the called-for speed remaining constant, it is believed well to consider briefly the relationship between the control signal and the voltage impressed on the motor. It will be understood from the preceding description that when the control signal is zero there is no voltage, or, at least no material or effective voltage impressed on the motor. As the control signal increases, either as a positive signal or as a negative signal, current will flow in the direct current coil of one of the reactors, thereby reducing the impedance of the alternating coils of that reactor and causing a voltage to be applied to the motor. As best seen from Fig. 5, the voltage applied to the motor rises very rapidly for small increases in the control signal, causing the full rated voltage of the motor, herein 220 volts, to be applied at that value of the control signal required to cause the motor to operate at the maximum rated speed of the motor and at the maximum rated load of the motor, which control signal value incidentally is comparatively small. As the control signal increases above the stated value, the voltage applied to the motor continues to rise rapidly until substantially the full line voltage is applied, at which time further increases in control signal produce no further increase in applied voltage, having already caused application of the maximum line voltage obtainable. Thus, between zero control signal and the control signal causing the full line voltage to be applied to the motor, the voltage applied to the motor is proportional to the control signal through the changes in applied voltage are large for very small changes in the control signal. This proportional though rapid change in voltage applied to the motor gives the desirable progressive approach to zero voltage, and hence zero torque. At the same time, it will be seen that the circuit provides for the application of the full 440 volts during control signal values exceeding even slightly the value producing the 220 volts on the motor, thereby giving added torque for rapidly effecting acceleration, deceleration and reversal, and coming into play with any changes exceeding the small variations in speed of or load on the motor. It is recognized that operating the motor 10 from a source having a voltage higher than the rated voltage of the motor entails certain disadvantages in higher cost of equipment and operation. It is believed, however, that these are more than offset by the rapid acceleration, deceleration and reversal obtained thereby.

In the graphs of Figs. 6 and 7, the abscissa axis represents time, while the ordinate axis represents appropriate units of measure of the various quantities represented by the curves. The portion of the graph of Fig. 6 at the extreme left represents the steady state operation of the system at some speed of the motor in a forward direction less than the full speed. At that state acceleration is zero, the torque of the motor is equal to the load torque, the main signal is of a value corresponding to the desired speed of the motor, and the pilot signal is just sufficiently less than the main signal so that the control signal will cause to be produced sufficient torque to maintain the speed of the motor at the given load. If then the main signal generating means 11 is adjusted to call for operation of the motor in a forward direction at an increased speed, the main signal will rise in value to the level 80 of the curve S. There will thus be immediately produced a control signal of greatly increased value rising sharply to the peak indicated at 81 of the curve CS. Appreciate that the graph represents the signal as applied at points A, B and not the very greatly amplified output of the amplifiers 13 and 14. This increase in control signal will, depending upon its magnitude, increase the voltage on the motor possibly even raising the voltage to the maximum 440 volts. Inasmuch as the torque of an electric motor is proportional to the square of the voltage, it will be readily apparent that momentarily then even though the increase of motor voltage may be less than the maximum amount, a large torque tending to accelerate the motor in a forward direction will be generated. This increase in torque is represented at 82 of the curve Tm. With this substantial increase in torque, there will, of course, be very rapid acceleration, as indicated by the rapid rise in the acceleration curve a, reaching a peak at the point 83. As the motor speeds up, the pilot signal will also increase in value (see curve P) and gradually reduce the difference between it and the main signal until at a point such as 84 the control signal will again be of such value as just to cause sufficient torque to be generated to drive the motor at the new speed. At points corresponding to the point 84 of the curve P, the curve CS will, of course, flatten out to become horizontal and, likewise, the torque curve and the acceleration curve will flatten out and became horizontal. The acceleration curve will from point 85 forward lie on the zero axis of the graph, the torque curve Tm will be just slightly higher than it had been because of the extra torque required to overcome the increased friction and windage and other resisting torques created by the increasing speed of the motor, and the control signal curve also will be slightly higher in value.

The above example illustrates the operation in the most simple condition, for the change called for nothing more than an increase in the speed of the motor requiring no deceleration and thus maintaining all of the signals, torques and the like positive. Let us assume, however, that the main signal generating means 11 is again adjusted to call for operation of the motor at the same speed as before. As a result, the curve S representing the main signal will drop sharply to the point 86. The motor can, of course, not decelerate as rapidly as the main signal generating means can be adjusted and hence, herein, a counter torque tending to aid deceleration of the motor will be obtained as is readily apparent from Fig. 6 and as will presently be described. As the main signal S decreases from its value represented at point 87 to its ultimate value at point 86, the difference in the main signal and the pilot signals will decrease until the point 88 is reached where the main signal is equal to the pilot signal P. During this interval the voltage on the motor has, of course, been decreasing rapidly, and hence the torque has been decreasing and the motor has been slowing down as a result of the load thereon. Momentarily, of course, there is no voltage on the motor whatsoever. As the main signal voltage continues its drop from the point 88 to the point 86, it is of lesser value than the pilot signal and hence there is again an increase in the difference between the two signals, that is, in the control signal, but, whereas the control signal had been positive, it is now negative, reaching a negative value represented at 89. (While the pilot signal generated during forward rotation is considered positive, it must be remembered that the pilot signal generator is connected back inversely.) This reversal in the control signal is herein utilizable to the fullest possible extent because of the provision of the saturable reactors for direct control of the motor. The reactors being entirely electrical in operation and free of any mechanical parts in the control of the voltage applied to the motor, are capable of responding instantaneously to these reversals in the control signal. With this reversal in the control signal, the other reactor takes control and hence there is also a reversal in the torque developed in the motor. This torque is now a counter torque aiding in the deceleration of the motor and it reaches a maximum value represented at 90 at the time of maximum value of the control signal. Similarly, the curve a now represents deceleration and thus is negative, reaching a maximum point at 91 and thereafter again becoming less and less until it reaches zero when the motor has been finally reduced to the desired lower speed.

With the counter torque now aiding the load torque to decelerate the motor, a rapid deceleration is effected and, with such deceleration, the pilot signal decreases rapidly and, in so doing, crosses the curve S representing the main signal at the point 92 where the two signals are again equal. There is now no counter torque, but the load torque, of course, containues to decelerate the motor and the pilot signal, therefore, drops below the main signal in value, and thus there is a second reversal in the character of the control signal and also of the torque of the motor. The control signal now again is positive, and the motor torque is positive and thus will again take up the drive of the motor, gradually taking up the load to drive the motor at the called-for speed. The values of the main signal, the pilot signal, the difference between the two or the control signal, and the motor torque are all now the same as they were at the extreme left hand side of the graph.

Fig. 7 depicts the operation upon an adjustment of the main signal generating means 11 calling for a reversal in the direction of rotation of the motor from a speed in forward direction to the same speed in the reverse direction. Under these conditions, the main signal voltage will change from the value indicated at 93 to the value indicated at 94. The magnitude of the signal at the points 93 and 94 is the same but is of opposite character or sign. While the main signal is changing from the value at 93 to the point 95 where it is just equal to the pilot signal, the torque, of course, is still such as tends to drive the motor in a forward direction but is progressively less until it is zero and thus, during this short interval, the motor has been decelerated by the load thereon and by the other factors such as friction, windage, etc. Following this, there is immediately set up a tremendous counter torque which tends very rapidly to decelerate the motor, for from point 95 forward the control signal is negative and thus causes the other reactor to take over control of the motor. The magnitude of this counter torque will be appreciated when it is realized that the pilot signal and the main signal are additive to produce the control signal from the time that the main signal reverses in character to the time that the motor reverses its direction of rotation, that is, when the curve P representing the pilot signal crosses the zero axis of the graph as at 96. This additive character of the pilot signal and the main signal becomes a fact almost simultaneously with adustment of the main signal generating means 11, for this adjustment may be made as rapidly as an individual may act. There is no necessity with this system to pause in a neutral position until the motor has come to rest, but the main signal generating means 11 may by a single movement be adjusted from one position through neutral to an opposite position. While on the scale drawn in Fig. 7 the torque would rise to such a value as to run off the scale, it is to be appreciated that, of course, there is a definite limit to the torque, namely, that obtained when the full 440 volts are applied to the motor. It will be appreciated that, even so, the torque tending to decelerate the motor will be four times the torque of the motor at its rated voltage. It is conceivable, of course, that a 110-volt motor might be operated from a 440-volt source so that the torque obtainable during reversal to effect deceleration, varying as it does with the square of the voltage, would be sixteen times that of the motor at its rated voltage. This same high torque is, of course, available during the initial acceleration period following reversal of the motor.

Upon reversal of the motor the pilot signal will again be counter to the main signal and thus the control signal will decrease in magnitude, though remaining negative as the speed of the motor increases. This change continues with the pilot signal progressively increasing in value as the motor speed increases, while the control signal and the torque progressively decrease until that point is reached where there is again just that difference between the main signal and the pilot signal as will produce the torque necessary to drive the motor at the speed for which the main signal means has been adjusted. The curve representing acceleration of the motor under such reversal will first increase in a negative direction, indicating the rapid deceleration of the motor, and will reach its maximum value at the time that the motor reverses and will then more gradually return to zero as the motor reaches a steady state operation.

The operation under the assumed condition of load changes with the adjustment of the main signal generating means 11 remaining the same will be readily appreciated from the foregoing description and the graphs of Figs. 6 and 7. A very brief statement of the operation it is believed will, therefore, suffice. If the load change is gradual, there will hardly be any appreciable effect in the operation of the motor regardless of whether the load increases or decreases. With the slightest change in the speed of the motor resulting from change in load, the pilot signal will change, and hence the control signal will take on a different magnitude and thus cause the torque developed by the motor to be increased or decreased to compensate for the change in load. With electrical changes so much more rapid than the mechanical changes of the motor, and with the circuit so sensitive, the change in load will be compensated for before there is any appreciable change in motor speed.

Should there be a very sudden and at the same time large increase in load on the motor, temporarily a condition would result and a reaction occur which would be generally similar to that which occurs when the main signal generating means 11 is adjusted for a higher speed such as was previously described. In either event, there is a large increase in the control signal. This, of course, would immediately cause a higher voltage to be applied to the motor, with resultant large increase in torque developed by the motor. The increase in control signal would in this instance, of course, have resulted from a slowing down of the motor due to the sudden application of the increased load and, as the motor again picked up speed, the pilot signal would again increase in magnitude until the control signal again was of such value that the torque produced by the motor would be just sufficient to maintain the motor operating at the called-for speed while carrying the increased load. Naturally, this final control signal would be slightly larger at the increased load on the motor than it was at the lower load.

Should there be a sudden and large decrease in load, the motor would naturally temporarily speed up and exceed its called-for speed. There would, therefore, result a condition generally similar to that above described when the main signal generating means 11 is adjusted to call for a lower speed. As described in the instance referred to, a reversal in the control signal takes place, resulting in the production by the motor of a counter torque acting to aid in the deceleration of the motor, the control signal reversing a second time at a point prior to the time that the motor has been reduced to the proper speed, permitting the torque again to act in the direction of rotation of the motor and gradually take over the drive of the motor so that at the time the called-for speed is reached the torque will again be just sufficient to drive the motor at the called-for speed while carrying the lower load.

While the above operation has been described as occurring when the circuit is used in conjunction with a motor designed or adjusted to have only the stable branch of its speed-torque characteristic, the circuit has been found to operate successfully in connection with a motor such as a squirrel cage induction motor having the conventional speed-torque characteristic with one unstable branch and one stable branch, such as shown in Fig. 9. Based on past experience, it would appear that the circuit would be unstable for any speeds of the motor less than the speed indicated by the highest point of the curve of Fig. 9. The circuit herein disclosed, however, has by actual test proved stable for all speeds of the motor including the range from zero to the speed at which maximum torque is developed, as indicated by the curve in Fig. 9. This is believed to be explained by the steepness of the curves of Fig. 5 and by the fact that the pilot signal generator 12 is so adjusted as to generate, for any given speed of the motor, a signal whose magnitude corresponds very nearly to the magnitude of the main signal when the main signal generating means is adjusted to call for corresponding speeds of the motor. With an amplifying circuit having such characteristics as to produce the curves of Fig. 5, and with the saturable reactors capable of responding with very great rapidity to changes in the control signal, the circuit may operate as described for a wound rotor motor or an oscillatory control of the motor may result.

By oscillatory control is meant that the motor is at more or less uniform intervals energized to drive it in the desired direction with intermittent intervals at which the energy supplied to the motor is greatly reduced and may possibly even be reversed so as to produce a counter torque. The natural tendency of a squirrel cage motor at any given load is, of course, to seek the higher of the two speeds corresponding to any given value of torque. Thus overrunning of the motor when a speed falling within the unstable portion or leg of the speed-torque curve is desired is the condition that must be guarded against. Herein such overrunning is prevented for, as soon as the motor speed approximates the speed called for by adjustment of the main signal means, the pilot signal will approximate to a greater and greater degree the magnitude of the main signal and thereby result in a very material reduction in the voltage applied to the motor, if not an actual cutting off of all voltage whatsoever. This momentary very great reduction or complete removal of voltage will, of course, result in a reduction of the motor speed. With such reduction, the pilot signal is also reduced and, due to the steepness of the curves of Fig. 5, even a small increase in signal voltage will result in application of a substantial voltage to the motor. With the circuit so sensitive, the percentage change in motor speed bringing about this alternate application of a substantial voltage and reduction to a low voltage is, of course, very small and completely imperceptible except to very sensitive devices. Stability is thus obtained because the motor under ordinary circumstances is prevented from actually reaching the called-for speed.

Should a condition exist, such as where the main signal is adjusted to call for a reduction in speed, an actual torque reversal will, of course, take place as described in connection with the wound rotor motor. This reversal in torque, where the pilot signal exceeds the main signal in magnitude, is a further safeguard assuring proper operation of the circuit at all times and is available to come into play should the motor for some reason or other tend to overrun its called-for speed despite the great reduction in voltage, as above described. In fact, it is not beyond the realm of possibility that the circuit herein disclosed is so sensitive as to constitute, in effect, a reversing circuit. Under such circumstances, the oscillatory control of the motor would not be mere oscillation between high and low voltage magnitudes, but between voltage magnitudes which are reversed in character, that is, herein of reversed phase sequence.

It is believed apparent from the foregoing that we have perfected a unique system for the control of both the direction and speed of rotation of alternating current motors, particularly multi-phase motors of the induction type, and that in so doing we have provided a real solution to a long existing problem never satisfactorily solved heretofore.

We claim as our invention:

1. A circuit for controlling the direction and speed of rotation of a multi-phase induction motor comprising a multi-phase power circuit for the motor; a pair of saturable reactors each having an alternating current winding for each phase of the power circuit and a direct current winding electromagnetically common to all of the alternating current windings, the alternating current windings being connected one in each line wire of the power circuit in series with the motor with the alternating current windings of one reactor connected to produce a different phase sequence from the windings of the other reactor, the alternating current windings normally having such a high impedance as to prevent any material application of voltage to the motor; and electrical control circuit means operable selectively and variably to energize the direct current windings to govern the direction and speed of rotation of the motor by control of the magnitude and phase sequence of the voltage applied to the motor including main signal generating means operable upon adjustment to generate signals of opposed character and of a magnitude corresponding to a desired direction and speed of rotation of the motor, operation responsive signal generating means driven from the motor and generating signals of opposed character depending upon the direction of rotation of the motor and of a magnitude substantially equal to the magnitude of the signal generated by the main signal means when the motor is rotated at the speed called for by said main signal means, and means greatly amplifying differences in the signals generated automatically to cause development of high counter torques to aid in deceleration of the motor and high torques for aiding in the acceleration of the motor where speed of the motor varies to any appreciable extent from the called for speed.

2. A circuit for controlling the direction and speed of rotation of a multi-phase induction motor comprising a multi-phase power circuit for the motor, a pair of saturable reactors each having alternating current windings to be connected in the power circuit for the motor and a direct current winding electromagnetically common to all of the alternating current windings, the alternating current windings normally having such a high impedance as to prevent any material application of voltage to the motor and being connected in the power circuit for the motor to produce opposite phase sequences and electrical control circuit means operable selectively and variably to energize the direct current windings to govern the direction and speed of rotation of the motor by control of the magnitude and phase sequence of the voltage applied to the motor including main signal generating means operable upon adjustment to generate signals of opposed character and of a magnitude corresponding to a desired direction and speed of rotation of the motor, operation responsive signal generating means driven from the motor and generating signals of a character depending upon the direction of rotation of the motor and of a magnitude proportional to the speed of rotation of the motor, a signal input circuit including signal receiving means and a pair of electronic valves selectively energizing said direct current windings depending upon the character of the resultant signal applied to said signal receiving means, and means for applying across said signal receiving means the signal of said main signal generating means and of said operation responsive signal generating means with the latter applied in inverse feed-back.

3. A circuit for controlling the direction and speed of rotation of a multi-phase induction motor comprising a multi-phase power circuit for the motor, a pair of saturable reactors each having alternating current windings to be connected in the power circuit for the motor and a direct current winding electromagnetically common to all of the alternating current windings, the alternating current windings normally having such a high impedance as to prevent any material application of voltage to the motor and being connected in the power circuit for the motor to produce opposite phase sequences and electrical control circuit means operable selectively and variably to energize the direct current windings to govern the direction and speed of rotation of the motor by control of the magnitude and phase sequence of the voltage applied to the motor including main signal generating means operable upon adjustment to generate signals of opposed character and of a magnitude corresponding to a desired direction and speed of rotation of the motor, operation responsive signal generating means driven from the motor and generating signals of a character depending upon the direction of rotation of the motor and of a magnitude proportional to the speed of rotation of the motor, and means in which the signal from said main signal and said operation responsive signal generating means are combined and employed automatically to select and variably to energize the direct current windings to maintain the direction and speed of rotation of the motor with that called for by adjustment of said main signal generating means independently of the character of the load on the motor.

4. A circuit for controlling the direction and speed of rotation of a multi-phase induction motor comprising a multi-phase power circuit for the motor, a pair of saturable reactors each having alternating current windings to be connected in the power circuit for the motor and a direct current winding electromagnetically common to all of the alternating current windings, the alternating current windings normally having such a high impedance as to prevent any material application of voltage to the motor and being connected in the power circuit for the motor to produce opposite phase sequences and electrical control circuit means operable selectively and variably to energize the direct current windings to govern the direction and speed of rotation of the motor by control of the magnitude and phase sequence of the voltage applied to the motor including main signal generating means operable upon adjustment to generate signals of opposed character and of a magnitude corresponding to a desired direction and speed of rotation of the motor, operation responsive signal generating means driven from the motor and generating signals of a character depending upon the direction of rotation of the motor and of a magnitude proportional to the speed of rotation of the motor, and signal combining means connected in said control circuit to effect automatic selection of the direct current winding to be energized depending upon the character of the resultant signal, with the degree of energization likewise depending on the resultant signal.

5. A circuit for controlling the direction and speed of rotation of a multi-phase induction motor comprising a multi-phase power circuit for the motor; a pair of saturable reactors each having an alternating current winding for each phase of the power circuit and a direct current winding electromagnetically common to all of the alternating current windings, the alternating current windings being connected one in each line wire of the power circuit in series with the motor with the alternating current windings of one reactor connected to produce a different phase sequence from the windings of the other reactor, the alternating current windings normally having such a high impedance as to prevent any material application of voltage to the motor; and electrical control circuit means operable manually and automatically to select and variably to energize the direct current windings to govern the direction and speed of rotation of the motor by control of the magnitude and phase sequence of the voltage applied to the motor including main signal generating means operable upon adjustment to generate signals of opposed character and of a magnitude corresponding to a desired direction and speed of rotation of the motor, operation responsive signal generating means driven from the motor and generating signals of a character depending upon the direction of rotation of the motor and of a magnitude proportional to the speed of rotation of the motor, and means connecting said operation responsive signal generating means with said main signal generating means in inverse feed-back.

6. A circuit for controlling the direction and speed of rotation of a multi-phase induction motor comprising a multi-phase power circuit for the motor; a first and a second set of windings, one winding of each set being connected in series with the motor in each line wire of the power circuit, with the windings of the different sets being connected in an altered manner so as to control the phase sequence of the voltage applied to the motor to govern the direction of rotation thereof, each of said windings normally having a high impedance preventing the application of any effective voltage on the motor, means for each set of windings operable upon energization to reduce the impedance of the windings of the set with which it is associated in proportion to the degree of energization of the means; adjustable means for selectively and variably energizing said means including main signal generating means operable upon adjustment to generate signals of opposed character and of a magnitude corresponding to a desired direction and speed of rotation of the motor, operation responsive signal generating means driven from the motor and generating signals of opposed character depending upon the direction of rotation of the motor and of a magnitude substantially equal to the magnitude of the signal generated by the main signal generating means when the motor is rotating at the speed called for by said main signal means, leads connecting said operation responsive signal means electrically in inverse feed-back with the main signal generating means, and means responsive to the character and magnitude of the signal resulting from the combination of the main and operation indicating signals selectively to energize one or the other of said first mentioned means to a degree proportional to the magnitude of the resulting signal.

7. A circuit for controlling the direction and speed of rotation of a multi-phase induction motor comprising a multi-phase power circuit for the motor; a pair of saturable reactors each having an alternating current winding for each phase of the power circuit and a direct current winding electromagnetically common to all of the alternating current windings, the alternating current windings being connected one in each line wire of the power circuit in series with the motor with the alternating current windings of one reactor connected to produce a different phase sequence from the windings of the other reactor, the alternating current windings normally having such a high impedance as to prevent any material application of voltage to the motor; and a control circuit for selectively and variably energizing the direct current windings to govern the direction and speed of rotation of the motor by control of the magnitude and phase sequence of the voltage applied to the motor comprising a pair of amplifier circuits connected in parallel each having connected therein to be controlled thereby one of the direct current windings, each of said amplifier circuits including a signal receiving stage with the stages coupled to be subjected to the same signal but responding to signals of opposed character, a main signal generating means operable to generate in said control circuit a signal adjustable as to character and magnitude, an operation responsive signal generating means driven from the motor and generating a signal in said control circuit of a character depending upon the direction of rotation of the motor and of a magnitude proportional to the speed of rotation of the motor and substantially equal to the magnitude of the main signal when the motor is rotating at the speed for which the main signal generating means has been adjusted, and a feed-back circuit connecting said operation indicating signal generating means with said main signal generating means in inverse feed-back.

8. A circuit for controlling the direction and speed of rotation of a multi-phase induction motor comprising a multi-phase power circuit for the motor; a first and a second set of windings, one winding of each set being connected in series with the motor in each line wire of the power circuit, with the windings of the different sets being connected in an altered manner so as to control the phase sequence of the voltage applied to the motor to govern the direction of rotation thereof, each of said windings normally having a high impedance preventing the application of any effective voltage on the motor; means for each set of windings operable upon energization to reduce the impedance of the windings of the set with which it is associated in proportion to the degree of energization of the means; and a single control circuit for selectively and variably energizing said means, said control circuit including adjustable means for generating signals in said control circuit corresponding to the desired direction and speed of rotation of the motor and operation responsive means operable to generate signals of a character and magnitude corresponding to the direction and speed of rotation of the motor and electrically interconnected in said control circuit means jointly with said adjustable means to maintain operation of the motor in a direction as well as at a speed substantially as called for by the adjustable means.

9. A circuit for controlling the direction and speed of rotation of a multi-phase induction motor comprising a multi-phase power supply circuit for the motor; a first saturable reactor having an alternating current winding for each phase of the power source and a direct current winding electromagnetically common to all of the alternating current windings, said alternating current windings being connected to the motor in a particular phase sequence to cause forward rotation of the motor; a second saturable reactor having an alternating current winding for each phase and a direct current winding electromagnetically common to all the alternating current windings, the last named alternating current windings being connected to the motor in a phase sequence different from that of the first reactor to cause reverse rotation of the motor; a single control circuit including the direct current winding of each of said reactors, a main signal generating means capable of generating signals of opposed character and adjustable magnitude and means responsive to said signals causing the direct current windings to be selectively energized depending upon the character of the signal; an operation responsive signal generating means driven from the motor and generating signals of a magnitude proportional to the angular velocity of the motor and of opposed character depending upon the direction of rotation of the motor; and a feed-back circuit connecting said last named signal generating means in said control circuit in inverse feed-back; said last named signal generating means being calibrated to generate signals of a magnitude, at the various speeds of rotation of the motor, substantially equal to the magnitude of the signals generated by the main signal generating means when adjusted to call for comparable speeds of the motor.

10. A circuit for controlling the direction and speed of rotation of a multi-phase induction motor comprising a multi-phase power circuit for the motor; a pair of saturable reactors each having an alternating current winding for each phase of the power circuit and a direct current winding electromagnetically common to all of the alternating current windings, the alternating current windings of one of said reactors being connected in the power circuit of the motor in a phase sequence differing from the alternating current windings of the other reactor to cause operation of the motor in one direction or the reverse direction as one or the other of said reactors takes over control of the motor; and a single control circuit for selectively and variably governing the energization of one or the other of the direct current windings to control the direction and speed of rotation of the motor, said means including main signal generating means operable to generate in said control circuit signals of opposed character and of adjustable magnitude, operation responsive signal generating means driven from the motor and generating signals of a magnitude proportional to the angular velocity of the motor and of opposed character depending upon the direction of rotation of the motor, and a feed-back circuit connecting said last named signal generating means in said control circuit in inverse feed-back.

References Cited in the file of this patent

UNITED STATES PATENTS

| Number | Name | Date |
|---|---|---|
| 1,231,666 | Stuart | July 3, 1917 |
| 1,353,815 | Meyer | Sept. 21, 1920 |
| 1,479,561 | Stoekle | Jan. 1, 1924 |
| 1,503,213 | Stoekle | July 29, 1924 |
| 1,831,069 | Higbee | Nov. 10, 1931 |
| 1,844,704 | Thompson | Feb. 9, 1932 |
| 1,849,646 | Stoller | Mar. 15, 1932 |
| 2,102,911 | Perry | Dec. 21, 1937 |
| 2,221,612 | Schaelchlin | Nov. 12, 1940 |
| 2,228,078 | Gulliksen | Jan. 7, 1941 |
| 2,287,459 | Uehling | June 23, 1942 |